United States Patent
Yamaguchi

(10) Patent No.: US 11,436,845 B2
(45) Date of Patent: Sep. 6, 2022

(54) OCCUPANT DETECTION APPARATUS, OCCUPANT DETECTION SYSTEM, AND OCCUPANT DETECTION METHOD

(71) Applicant: DENSO CORPORATION, Kariya (JP)

(72) Inventor: Taichi Yamaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 455 days.

(21) Appl. No.: 16/442,595

(22) Filed: Jun. 17, 2019

(65) Prior Publication Data
US 2019/0303695 A1 Oct. 3, 2019

Related U.S. Application Data

(63) Continuation of application No. PCT/JP2017/038661, filed on Oct. 26, 2017.

(30) Foreign Application Priority Data

Dec. 20, 2016 (JP) .............................. JP2016-246140

(51) Int. Cl.
| | |
|---|---|
| *G06V 20/59* | (2022.01) |
| *H04W 4/48* | (2018.01) |
| *G01S 5/02* | (2010.01) |
| *B60H 1/00* | (2006.01) |

(52) U.S. Cl.
CPC .............. *G06V 20/593* (2022.01); *G01S 5/02* (2013.01); *H04W 4/48* (2018.02); *B60H 1/00* (2013.01)

(58) Field of Classification Search
CPC ....... G06K 9/00838; H04W 4/48; G01S 5/02; B60H 1/00

USPC ............................................................. 701/1
See application file for complete search history.

(56) References Cited

U.S. PATENT DOCUMENTS

| | | | | |
|---|---|---|---|---|
| 2014/0107846 A1* | 4/2014 | Li | ......................... | H04W 4/029 |
| | | | | 700/275 |
| 2014/0375808 A1* | 12/2014 | Kao | ......................... | G06K 9/00 |
| | | | | 348/148 |
| 2019/0052747 A1* | 2/2019 | Breaux | .................... | H04W 4/48 |

FOREIGN PATENT DOCUMENTS

JP 2003248045 A * 9/2003

OTHER PUBLICATIONS

English Translation of JP-2003248045-A, accessed Sep. 2021 from Espacenet (Year: 2021).*

* cited by examiner

*Primary Examiner* — Krishnan Ramesh
(74) *Attorney, Agent, or Firm* — Harness, Dickey & Pierce, P.L.C.

(57) ABSTRACT

An occupant detection apparatus includes a first detection unit, a second detection unit, and an occupant presence determination unit. The first detection unit detects an occupant present in a first region or a second region, among the plurality of regions. The second detection unit detects an occupant present in the second region or a third region, among the plurality of regions. The occupant presence determination unit determines whether an occupant is present in each of the first region, the second region and the third region, based on a first detection result obtained by the first detection unit and a second detection result obtained by the second detection unit.

10 Claims, 8 Drawing Sheets

FIG. 4A
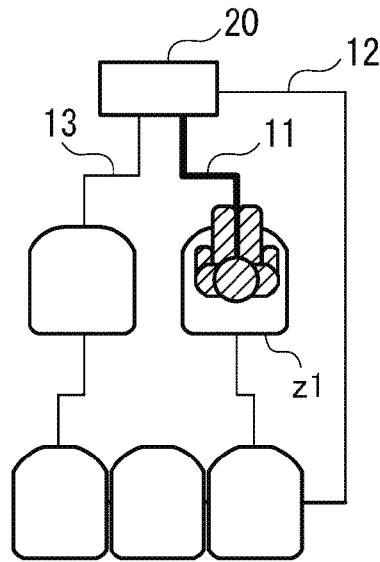
FIG. 4B
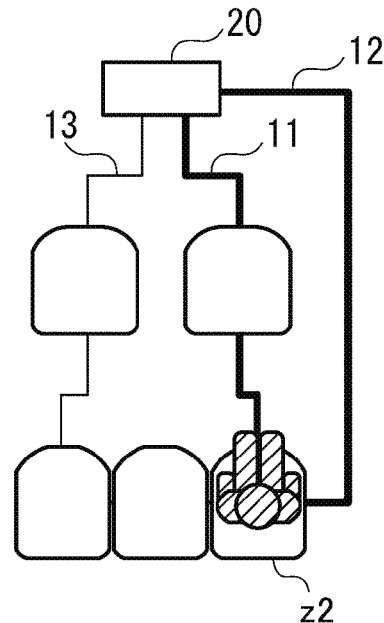
FIG. 5
| FIRST DETECTION UNIT 41 | SECOND DETECTION UNIT 42 | THIRD DETECTION UNIT 43 | OCCUPIED SEAT |
|---|---|---|---|
| ○ | ◉ | ◉ | ⇒ FRONT RIGHT SEAT z1 |
| ○ | ○ | ◉ | ⇒ REAR RIGHT SEAT z2 |
| ◉ | ○ | ○ | ⇒ REAR LEFT SEAT z3 |
| ◉ | ◉ | ○ | ⇒ FRONT LEFT SEAT z4 |
| ◉ | ○ | ◉ | ⇒ REAR CENTER SEAT z5 | though, if an# OCCUPANT DETECTION APPARATUS, OCCUPANT DETECTION SYSTEM, AND OCCUPANT DETECTION METHOD

CROSS REFERENCE TO RELATED APPLICATIONS

The present application is a continuation application of International Patent Application No. PCT/JP2017/038661 filed on Oct. 26, 2017, which designated the United States and claims the benefit of priority from Japanese Patent Application No. 2016-246140 filed on Dec. 20, 2016. The entire disclosures of all of the above applications are incorporated herein by reference.

TECHNICAL FIELD

The present disclosure relates to an occupant detection apparatus, an occupant detection system, and an occupant detection method for detecting a region where an occupant is present among a plurality of regions in a vehicle cabin.

BACKGROUND

If a position of an occupant can be detected in a vehicle cabin, various services can be provided to the occupant based on the detected position. For example, air-conditioning may be preferentially performed to a region where an occupant is present. Thus, more comfortable air conditioning can be provided while improving the efficiency.

SUMMARY

The present disclosure describes an occupant detection apparatus, an occupant detection system and an occupant detection method for detecting a region where an occupant is present among a plurality of regions in a vehicle cabin, by determining whether an occupant is present for each of the plurality of regions.

BRIEF DESCRIPTION OF DRAWINGS

The above and other objects, features and advantages of the present disclosure will become more apparent from the following detailed description made with reference to the accompanying drawings, in which:

FIG. 4A is an explanatory diagram illustrating a state for determination of a presence of an occupant on a front right seat by an occupant detection apparatus;

FIG. 4B is an explanatory diagram illustrating a state for determination of a presence of an occupant on a rear right seat by the occupant detection apparatus;

FIG. 5 is an explanatory diagram illustrating occupant presence determination results based on detection states by respective detection units;

DETAILED DESCRIPTION

Figure 1:
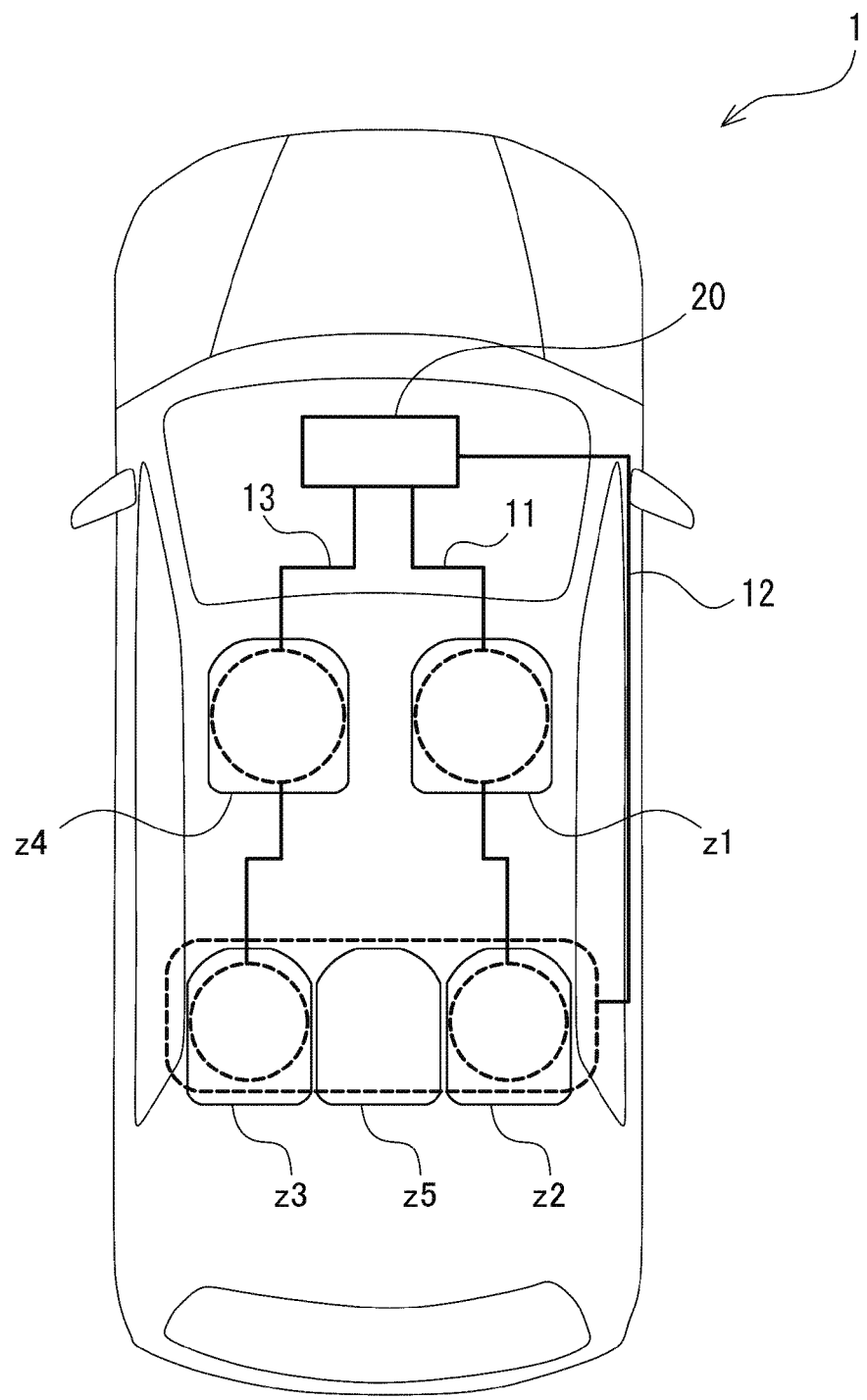
FIG. 1 is an explanatory diagram illustrating a structure of an occupant detection system for detecting an occupant in a vehicle cabin according to an embodiment of the present disclosure.

For example, it is conceivable to arrange antennas at plural locations in a vehicle cabin and to detect a position of an occupant based on the reception intensity of a radio wave transmitted from a wireless terminal carried by the occupant and received by each antenna. In such a case, however, if an obstacle, such as a human body, exists between the wireless terminal and the antenna, the radio wave may be attenuated and the reception intensity may be lowered, resulting in degradation of accuracy of the occupant detection.

According to an aspect of the present disclosure, an occupant detection apparatus is configured to detect, among a plurality of regions in a vehicle cabin, a region where an occupant is present. The occupant detection apparatus includes a first detection unit, a second detection unit, and an occupant presence determination unit. The first detection unit is configured to detect an occupant present in a first region or a second region, among the plurality of regions. The second detection unit is configured to detect an occupant present in the second region or a third region, among the plurality of regions. The occupant presence determination unit is configured to determine whether an occupant is present in each of the first region, the second region and the third region, based on a first detection result obtained by the first detection unit and a second detection result obtained by the second detection unit.

For example, when the first detection unit detects an occupant, the occupant presence determination unit determines that an occupant is present in the first region. When the first detection unit detects an occupant and the second detection unit detects an occupant, the occupant presence determination unit determines that an occupant is present in the second region. When the second detection unit detects an occupant, the occupant presence determination unit determines that an occupant is present in the third region.

As described above, a presence of an occupant in each region is determined based on a detection result of each detection unit. In such a configuration, since it is not necessary to calculate a position of an occupant based on the reception intensity, it is possible to accurately detect a position of an occupant.

According to a second aspect of the present disclosure, an occupant detection system is configured to detect, among a plurality of regions in a vehicle cabin, a region where an occupant is present. The occupant detection system includes a first detector, a second detector and an occupant detection apparatus. The first detector is to be disposed in the vehicle cabin, and is configured to detect an occupant present in a first region or a second region, among the plurality of regions. The second detector is to be disposed in the vehicle cabin, and is configured to detect an occupant present in the second region or a third region, among the plurality of regions. The occupant detection apparatus is configured to determine whether an occupant is present in each of the first region, the second region and the third region, based on a signal received from the first detector and a signal received from the second detector.

According to a third aspect of the present disclosure, an occupant detection method is for detecting a region where an occupant is present among a plurality of regions in a vehicle cabin. The occupant detection method including: performing a first determination that determines whether an occupant is present in a first region or a second region among the plurality of regions; performing a second determination that determines whether an occupant is present in the second region or a third region among the plurality of regions; and determining whether an occupant is present in each of the first region, the second region and the third region, based on a first determination result obtained by the first determination and a second determination result obtained by the second determination.

Embodiments of the present disclosure will be hereinafter described with reference to the drawings.

A. Configuration of System

An overall structure of an occupant detection system 1 for detecting an occupant in a vehicle cabin is illustrated in FIG. 1. In the vehicle cabin, a plurality of detection target regions, as targets to detect an occupant, are defined. The occupant detection system 1 detects, among the plurality of detection target regions, a detection target region where an occupant is present. In an example shown in FIG. 1, a plurality of seats are arranged in a vehicle cabin, and respective seats are defined as the detection target regions.

In the example of FIG. 1, as the plurality of detection target regions described above, a front right seat z1, a rear right seat z2, a front left seat z4, a rear left seat z3, and a rear center seat z5 are provided. For example, the front right seat z1 corresponds to a driver's seat, and the rear right seat z2 is behind the driver's seat. The front left seat z4 corresponds to a front passenger's seat, and the rear left seat z3 is behind the front passenger's seat. The rear center seat z5 is between the rear right seat z2 and the rear left seat z3. The occupant detection system 1 determines whether an occupant is present for each seat in the following manner.

In the vehicle cabin, a plurality of detectors for detecting occupants are provided. As the detector, a slot antenna in which a slit is formed in a metal plate or a waveguide may be used. The detector receives a radio wave transmitted from a wireless terminal carried by an occupant, thereby detecting the occupant.

The slot antenna has a slit at a position corresponding to a particular seat. Therefore, the slot antenna senses an occupant on the particular seat while inhibiting sensing of occupants on the other seats. The detector may not be limited to the slot antenna as long as an occupant on the particular seat can be detected while prohibiting detection of occupants on the other seats.

In the example shown in FIG. 1, as the plurality of detectors, a first antenna 11 for sensing an occupant on the front right seat z1 and an occupant on the rear right seat z2, a second antenna 12 for sensing occupants on the rear right seat z2, the rear center seat z5 and the rear left seat z3, and a third antenna 13 for sensing occupants on the front left seat z4 and the rear left seat z3 are arranged.

In a case where an occupant is present on the front right seat z1, the first antenna 11 senses the occupant. In a case where an occupant is present on the rear right seat z2, the first antenna 11 and the second antenna 12 sense the occupant. In a case where an occupant is present on the rear left seat z3, the second antenna 12 and the third antenna 13 sense the occupant. In a case where an occupant is present on the front left seat z4, the third antenna 13 senses the occupant. In a case where an occupant is present on the rear center seat z5, the second antenna 12 senses the occupant.

In the present embodiment, the front right seat z1 corresponds to a "first region", and the rear right seat z2 corresponds to a "second region". Also, the rear left seat z3 corresponds to a "third region", the front left seat z4 corresponds to a "fourth region", and the rear center seat z5 corresponds to a "fifth region". Further, the first antenna 11 corresponds to a "first detector", the second antenna 12 corresponds to a "second detector", and the third antenna 13 corresponds to a "third detector".

The first antenna 11, the second antenna 12, and the third antenna 13 are coupled to an occupant detection apparatus 20, and the sensing results of the first to third antennas 11 to 13 are provided to the occupant detection apparatus 20. Hereinafter, the first antenna 11, the second antenna 12, and the third antenna 13 will also be simply referred to as the antennas 11 to 13.

Figure 2:
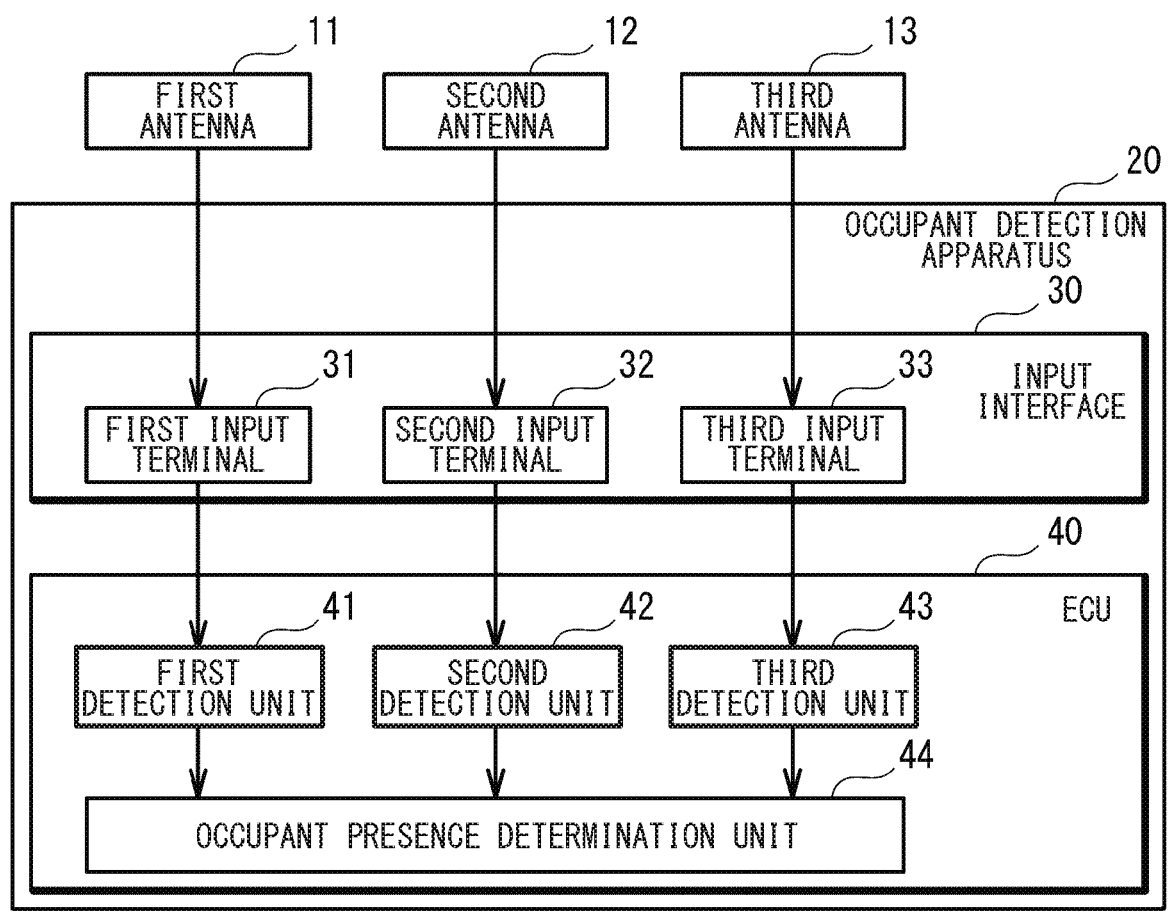
FIG. 2 is a block diagram illustrating an internal configuration of the occupant detection system.

FIG. 2 shows the internal configuration of the occupant detection system 1 including the antennas 11 to 13 and the occupant detection apparatus 20 described hereinabove. The occupant detection apparatus 20 has an input interface 30 for receiving signals from the antennas 11 to 13 therein, and an ECU 40 that performs various controls based on information received by the input interface 30.

The input interface 30 includes a first input terminal 31 for receiving a signal from the first antenna 11, a second input terminal 32 for receiving a signal from the second antenna 12, and a third input terminal 33 for receiving a signal from the third antenna 13.

The ECU 40 includes a first detection unit 41, a second detection unit 42, a third detection unit 43, and an occupant presence determination unit 44.

The first detection unit 41 can detect an occupant present on the front right seat z1 or an occupant present on the rear right seat z2 based on the signal received by the first input terminal 31. The second detection unit 42 can detect an occupant present on the rear right seat z2, an occupant present on the rear center seat z5, or an occupant present on the rear left seat z3 based on the signal received by the second input terminal 32. The third detection unit 43 can detect an occupant present on the front left seat z4 or an occupant present on the rear left seat z3 based on the signal received by the third input terminal 33.

The occupant presence determination unit 44 performs an occupant presence determination process for determining whether an occupant is present on each seat, that is, whether each seat is occupied, based on detection results of the first detection unit 41, the second detection unit 42, and the third detection unit 43. Hereinafter, the first detection unit 41, the second detection unit 42 and the third detection unit 43 will also be simply referred to as the detection units 41 to 43.

Note that the term "units" in the present disclosure may be abstract and be classified inside of the ECU 40 for convenience from the viewpoint of its function while focusing on the function that the ECU 40 of the occupant detection apparatus 20 of the present embodiment determines the presence or absence of an occupant on each seat. Namely, the term "units" do not necessarily mean that the ECU 40 is physically divided.

As such, the "units" may be realized as a computer program executed by a CPU, may be realized as an electronic circuit including an LSI, or may be realized as a combination of the computer program and the electronic circuit.

B. Occupant Presence Determination Process

Figure 3:
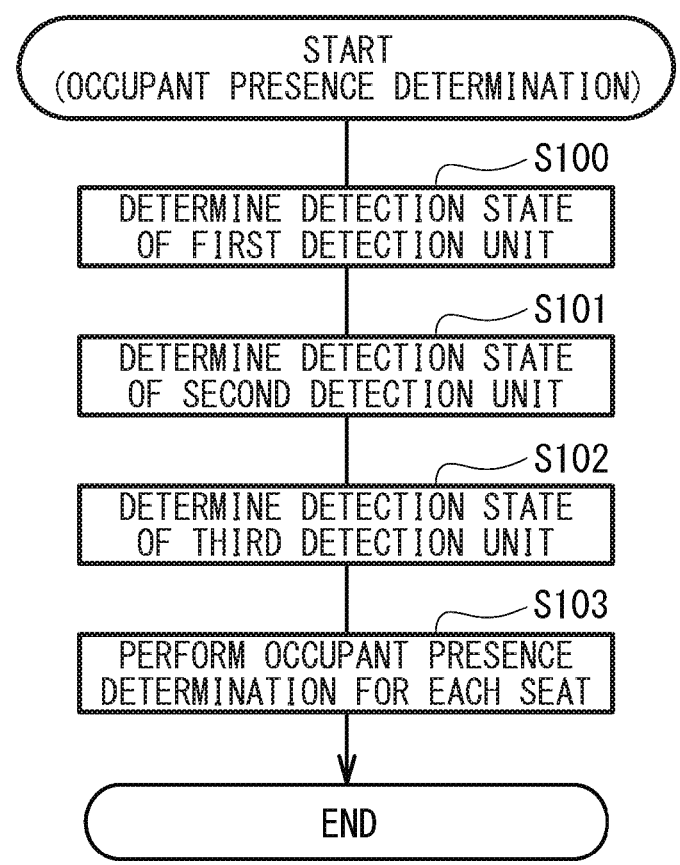
FIG. 3 is a flowchart illustrating an occupant presence determination process.

FIG. 3 shows a flowchart of the aforementioned occupant presence determination process. In the occupant presence determination process, it is determined whether the first detection unit 41 has detected an occupant, that is, whether an occupant is present on the front right seat z1 or the rear right seat z2 (S100). It is determined whether the second detection unit 42 has detected an occupant, that is, whether an occupant is present on the rear right seat z2, the rear center seat z5 or the rear left seat z3 (S101). It is determined whether the third detection unit 43 has detected an occupant, that is, whether an occupant is present on the rear left seat z3 or the front left seat z4 (S102). Further, it is determined whether an occupant is present for each seat based on these detection results, that is, an occupant presence determination is performed for each seat (S103).

FIGS. 4A and 4B illustrate examples of seats and modes that the occupant detection apparatus 20 performs the occupant presence determination to determine the seat occupied. In the example of FIG. 4A, an occupant is present on the front right seat z1. In this case, the occupant is sensed by the first antenna 11, but is not sensed by the second antenna 12 and the third antenna 13. Therefore, although the first detection unit 41 detects an occupant, the other detection units do not detect occupants. Accordingly, the occupant detection apparatus 20 determines that an occupant is present on the front right seat z1, which is a detection target to be solely detected by the first detection unit 41.

In the example of FIG. 4B, an occupant is present on the rear right seat z2. In this case, the occupant is sensed by the first antenna 11 and the second antenna 12, but is not sensed by the third antenna 13. Therefore, although the first detection unit 41 and the second detection unit 42 detect an occupant, the third detection unit 43 does not detect an occupant. Accordingly, the occupant detection apparatus 20 determines that an occupant is present on the rear right seat z2, which is a detection target to be detected by both of the first detection unit 41 and the second detection unit 42.

Further, the presence of an occupant for the other seats can be determined in the similar manner. FIG. 5 illustrates determination results corresponding to the detection states of the respective detection units 41 to 43. In FIG. 5, each blank circle mark indicates that the detection unit has detected an occupant, and each dotted circle mark indicates that the detection unit has not detected an occupant.

As shown in FIG. 5, in a case where the second detection unit 42 and the third detection unit 43 have detected occupants, but the first detection unit 41 has detected no occupant, the occupant detection apparatus 20 determines that an occupant is present on the rear left seat z3, which is the detection target to be detected by both the first detection unit 42 and the third detection unit 43.

In a case where the third detection unit 43 has detected an occupant, but the other detection units have detected no occupant, the occupant detection apparatus 20 determines that an occupant is present on the front left seat z4, which is the detection target to be solely detected by the third detection unit 43.

In a case where the second detection unit 42 has detected an occupant, but the other detection units have detected no occupant, the occupant detection apparatus 20 determines that an occupant is present on the rear center seat z5, which is the detection target to be solely detected by the second detection unit 42.

As described above, according to the above-described technology, it is possible to determine whether an occupant is present in each seat, that is, whether each seat is occupied, based on whether each of the detection units 41 to 43 has detected an occupant. In such a case, it is possible to accurately detect the position of an occupant. It is not necessary to determine the position of the occupant based on the reception intensity.

Furthermore, in the above-described technology, the presence of an occupant can be determined for five seats based on the signals received by the three input terminals, such as the first input terminal 31, the second input terminal 32, and the third input terminal 33. Therefore, as compared with a case where input terminals are correspondingly provided for the respective seats, the number of the input terminals can be reduced.

The present embodiment is not limited to the case where the number of the input terminals is three. Even if the number of the input terminals is two or four, as long as the number of the input terminals is less than the number of determination regions to determine the presence of an occupant, the number of the input terminals can be reduced smaller than that in the case where the input terminals are correspondingly provided for the respective regions.

In the above-described technology, it is possible to determine the presence of an occupant for the five seats based on the sensing results of the three antennas. Therefore, the number of the antennas can be reduced smaller than that in a case where the antennas are correspondingly provided for the respective seats.

The present embodiment is not limited to the case where the number of the antennas is three. Even if the number of the antennas is two or four, as long as the number of the antennas is less than the number of determination regions to determine the presence of an occupant, the number of the antennas can be reduced smaller than that in the case where the antennas are correspondingly provided for the respective regions.

In the embodiment described hereinabove, the occupant detection target region is set per seat. However, each detection target region may be set per any unit other than each seat. For example, in a case where seats are arranged in plural rows in a vehicle front and rear direction or in a vehicle right and left direction, each detection target region may be set per each row.

In the embodiment described hereinabove, the occupant presence detection is exemplarily employed for the cabin of an automobile. Alternatively, the occupant presence detection of the present disclosure may be employed for any vehicle, such as a bus or a train, other than the automobile. Namely, it is possible to set a plurality of detection target regions in a cabin of a vehicle other than an automobile, thereby to detect the detection target region in which an occupant is present.

C. First Modification

In the embodiment described hereinabove, it is assumed that the number of occupants is one. However, the present disclosure can be applied to the case where the number of occupants is two or more. Hereinafter, a first modification will be described. In the first modification, it is possible to determine the presence of occupant for each seat even when there are two or more occupants in a vehicle cabin. Hereinafter, configurations different from those of the above described embodiment will be mainly described, and description of the similar configurations will not be repeated.

Figure 6:
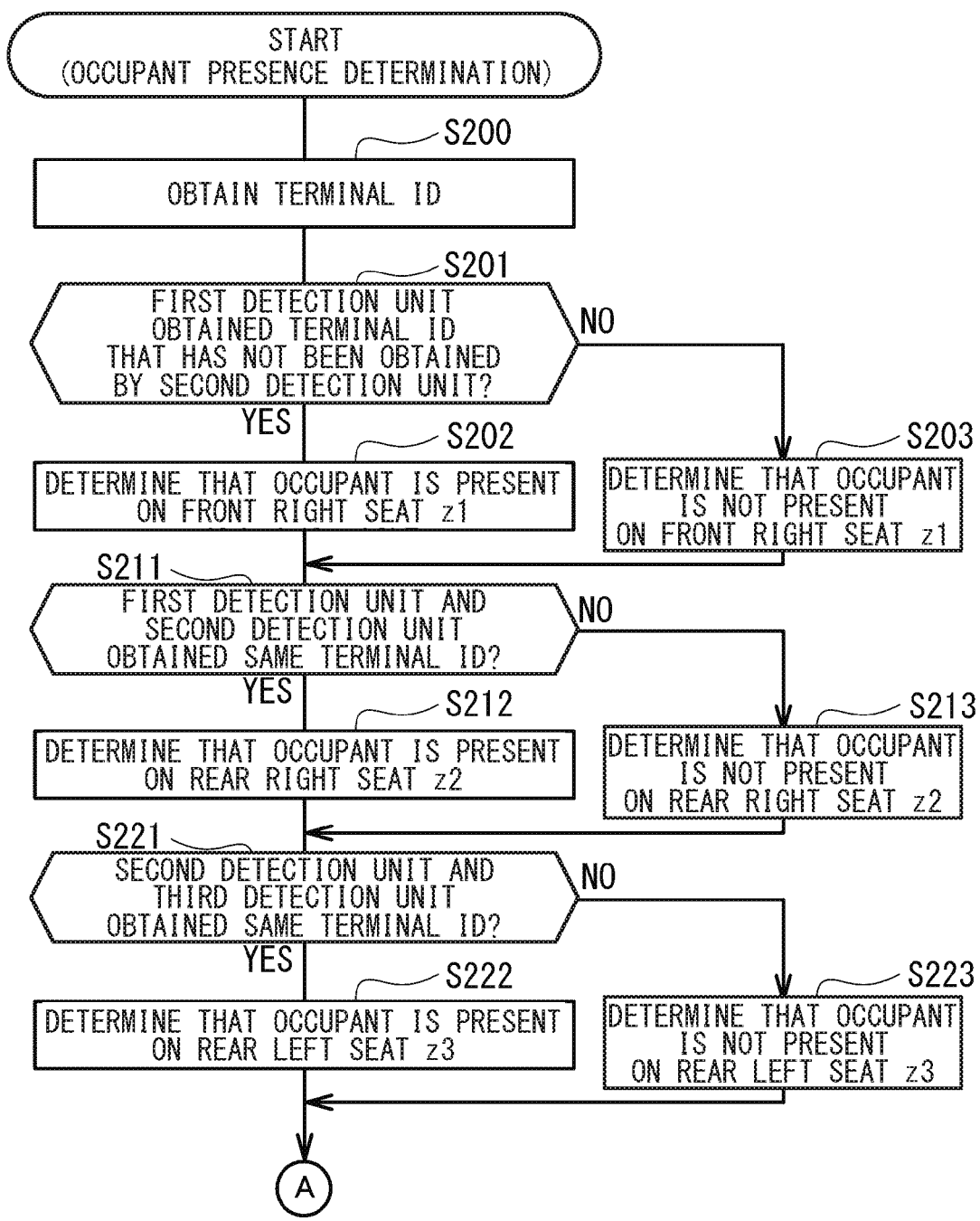
FIG. 6 is a flowchart illustrating the first half of an occupant presence determination process of a first modification.
Figure 7:
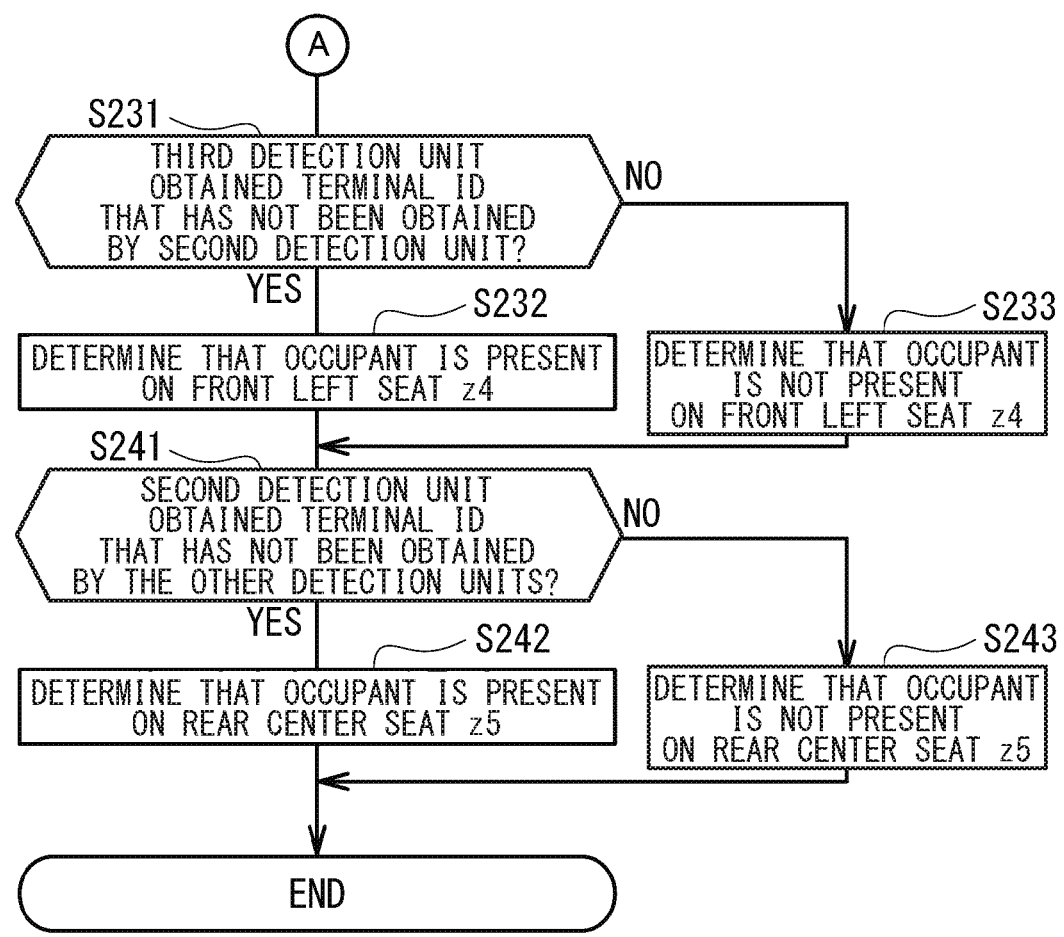
FIG. 7 is a flowchart illustrating the second half of the occupant presence determination process of the first modification.

In the first modification, an occupant presence determination process shown in FIG. 6 and FIG. 7 is performed, in place of the occupant presence determination process shown in FIG. 3. In the occupant presence determination process of the first modification, the detection units 41 to 43 of the occupant detection apparatus 20 obtain terminal IDs through the antennas 11 to 13 for detecting occupants (S200). The terminal ID indicates identification information of a wireless terminal. The occupant detection apparatus 20 determines, based on the terminal ID obtained, whether an occupant is present for each seat.

For example, in determining whether an occupant is present on the front right seat z1, it is determined whether the first detection unit 41 has obtained a terminal ID that has not been obtained by the second detection unit 42 (S201). When it is determined that the first detection unit 41 has obtained the terminal ID that has not been obtained by the second detection unit 42 (S201: YES), it is determined that an occupant is present on the front right seat z1, which can be detected by the first detection unit 41, but cannot be detected by the second detection unit 42.

When the first detection unit 41 has not obtained the terminal ID that has not been obtained by the second detection unit 42 (S201: NO), it is determined that an occupant is not present on the front right seat z1, which can be detected by the first detection unit 41, but cannot be detected by the second detection unit 42 (S203).

In determining whether an occupant is present on the rear right seat z2, it is determined whether the first detection unit 41 and the second detection unit 42 have obtained the same terminal ID (S211). When the first detection unit 41 and the second detection unit 42 have obtained the same terminal ID (S211: YES), it is determined that an occupant is present on the rear right seat z2, which can be detected by both of the first detection unit 41 and the second detection unit 42 (S212). On the contrary, when the first detection unit 41 and the second detection unit 42 have not obtained the same terminal ID (S211: NO), it is determined that an occupant is not present on the rear right seat z2, which can be detected by both of the first detection unit 41 and the second detection unit 42 (S213).

In determining whether an occupant is present on the rear left seat z3, it is determined whether the second detection unit 42 and the third detection unit 43 have obtained the same terminal ID (S221). When the second detection unit 42 and the third detection unit 43 have obtained the same terminal ID (S221: YES), it is determined that an occupant is present on the rear left seat z3, which can be detected by both of the second detection unit 42 and the third detection unit 43 (S222).

On the contrary, when the second detection unit 42 and the third detection unit 43 have not obtained the same terminal ID (S221: NO), it is determined that an occupant is not present on the rear left seat z3, which can be detected by both of the second detection unit 42 and the third detection unit 43 (S223).

In determining whether an occupant is present on the front left seat z4, it is determined whether the third detection unit 43 has obtained the terminal ID that has not been obtained by the second detection unit 42 (S231). When the third detection unit 43 has obtained the terminal ID that has not been obtained by the second detection unit 42 (S231: YES), it is determined that an occupant is present on the front left seat z4, which can be detected by the third detection unit 43, but cannot be detected by the second detection unit 42 (S232).

On the contrary, when the third detection unit 43 has not obtained the terminal ID that has not been obtained by the second detection unit 42 (S231: NO), it is determined that an occupant is not present on the front left seat z4, which can be detected by the second detection unit 42, but cannot be detected by the second detection unit 42 (S233).

In determining whether an occupant is present on the rear center seat z5, it is determined whether the second detection unit 42 has obtained a terminal ID that has not been obtained by the other detection units (S241). When the second detection unit 42 has obtained the terminal ID that has not been obtained by the other detection units (S241: YES), it is determined that an occupant is present on the rear center seat z5, which can be detected by the second detection unit 42, but cannot be detected by the other detection units (S242).

On the contrary, when the second detection unit 42 has not obtained the terminal ID that has not been obtained by the other detection units (S241: NO), it is determined that an occupant is not present on the rear center seat z5, which can be detected by the second detection unit 42, but cannot be detected by the other detection units (S243).

Figure 8A:
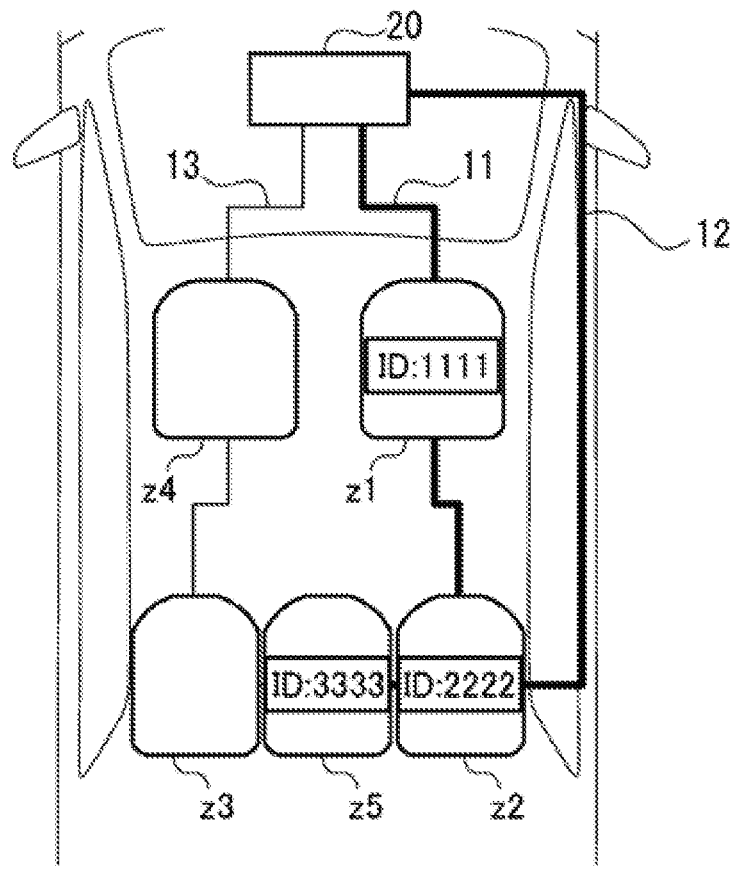
FIG. 8A is an explanatory diagram illustrating a state for an occupant determination for respective seats in a case where a front right seat, a rear right seat and a rear center seat are occupied, based on terminal IDs obtained by respective detection units of the first modification.

FIG. 8A illustrates an example of a state for determining whether an occupant is present on each seat. In the example of FIG. 8A, occupants are present on the front right seat z1, the rear right seat z2, and the rear center seat z5. The terminal ID of the wireless terminal carried by the occupant on the front right seat z1 is "1111", and the terminal ID of the wireless terminal carried by the occupant on the rear right seat z2 is "2222". The terminal ID of the wireless terminal carried by the occupant on the rear center seat z5 is "3333".

Figure 8B:
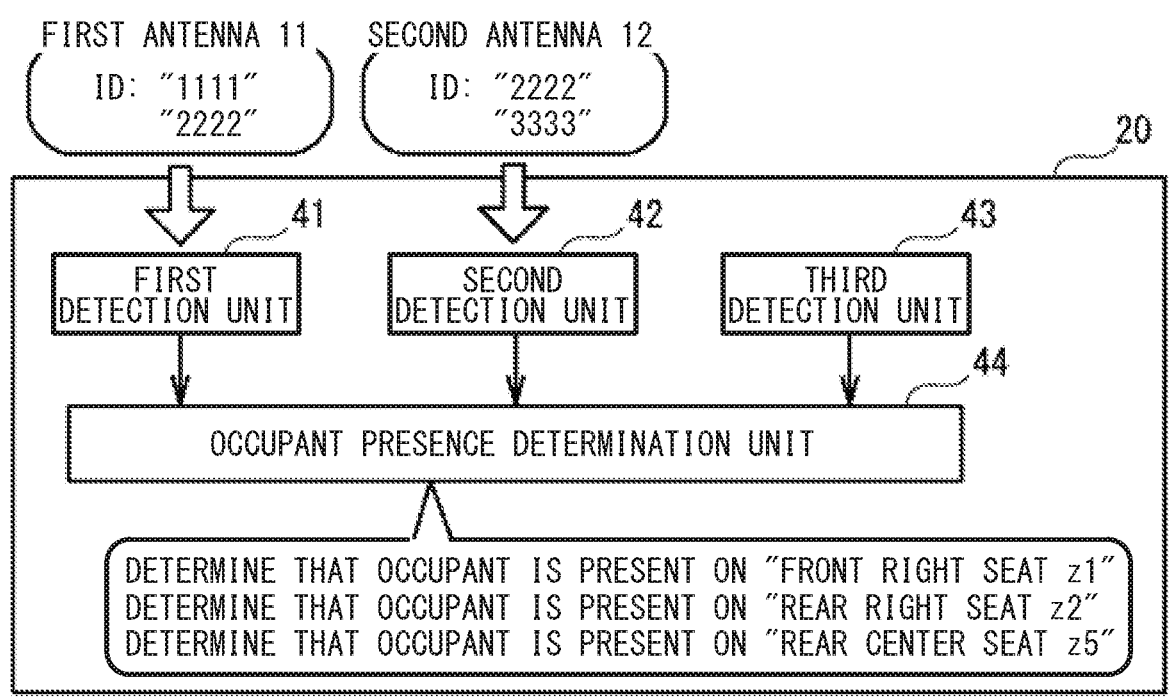
FIG. 8B is an explanatory diagram illustrating determination performed by the occupant detection apparatus in the case shown in FIG. 8A.

Therefore, as shown in FIG. 8B, the first detection unit 41 obtains the terminal ID "1111" and the terminal ID "2222". The second detection unit 42 obtains the terminal ID "2222" and the terminal ID "3333". The third detection unit 43 obtains no terminal ID.

Since the first detection unit 41 has obtained the terminal ID "1111", which has not been obtained by the second detection unit 42, the occupant detection apparatus 20 determines that an occupant is present on the front right seat z1. Further, since the first detection unit 41 and the second detection unit 42 have obtained the same terminal ID "2222", the occupant detection apparatus 20 determines that an occupant is present on the rear right seat z2. Furthermore, since the second detection unit 42 has obtained the terminal ID "3333", which has not been obtained by the other detection units, the occupant detection apparatus 20 determines that an occupant is present on the rear center seat z5.

In addition, since the second detection unit 42 and the third detection unit 43 have not obtained the same terminal ID, the occupant detection apparatus 20 determines that an occupant is not present on the rear left seat z3. Further, since the third detection unit 43 has not obtained the terminal ID that has not been obtained by the second detection unit 42, the occupant detection apparatus 20 determines that an occupant is not present on the front left seat z4.

As described above, according to the technology of the first modification described hereinabove, not only the occupied seat can be accurately detected, but also the presence of an occupant can be determined for each seat even if there are two or more occupants.

D. Second Modification

In the embodiment and first modification described hereinabove, each seat is set as a detection target region for determining the presence of an occupant. Alternatively, regions each including a plurality of seats can also be set as detection target regions. Namely, each region may be provided by a plurality of seats. Also, it is possible to set a seat in a vehicle cabin, as a non-detection target, that is to be excluded from the detection target regions. Hereinafter, it will be described a second modification in which regions each including a plurality of seats are set as the detection target regions, as well as there is a seat that is not set as the detection target region. Hereinafter, configurations different from those of the above described embodiment will be mainly described, and description of the similar configurations will not be repeated.

Figure 9:
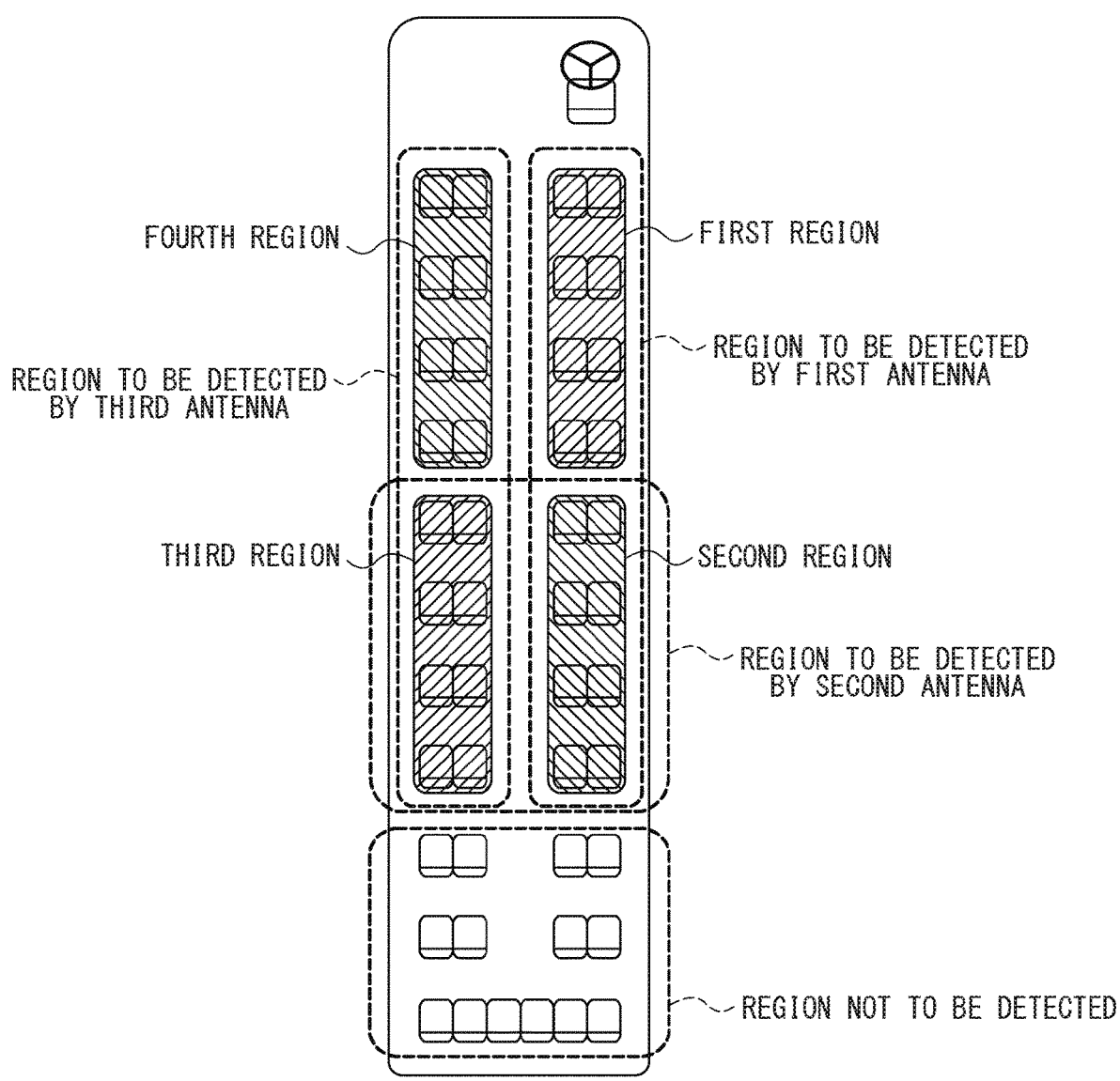
FIG. 9 is an explanatory diagram for explaining occupant detection regions of a second modification.

In the second modification, the present disclosure is exemplarily employed to a bus having a plurality of seats. As shown in FIG. 9, the bus has plural pairs of seats each facing toward a front of the bus. The pairs of seats are aligned in two rows, such as in a right row and a left row, and each row being in a front and rear direction of the bus.

The plural pairs of seats are sectioned into detection target regions, for example, into first to fourth regions. The first region includes the first to fourth pairs of seats from the front on the right row. The second region includes the fifth to eighth pairs of seats from the front on the right row. The third region includes the fifth to eighth pairs of seats from the front on the left row, and the fourth region includes the first to fourth pairs of seats front the front on the left row. The ninth pairs of seats and seats behind the ninth pairs of seats from the front are included in a non-detection target region to which the presence of an occupant is not determined.

The first antenna 11 senses occupants present on the first to eighth pairs of seats on the right row so as to detect occupants in the first region or the second region.

The second antenna 12 senses occupants present on the fifth to eighth pairs of seats in the right and left rows so as to detect occupants in the second region or the third region. The third antenna 13 senses occupants on the first to fourth pairs of seats in the left row so as to detect occupants present in the third region or the fourth region.

Therefore, even when a plurality of seats are set as the detection target region, the presence of occupants can be determined for each of the regions, such as the first region, the second region, the third region and the fourth region, based on the sensing results of the antennas 11-13, that is, based on the detection results of the detection units 41 to 44.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An occupant detection apparatus configured to detect a region where an occupant is present from among a plurality of detection zones in a vehicle cabin, the plurality of detection zones including a first detection zone and a second detection zone, the occupant detection apparatus comprising:
    a processor configured to
        perform a first detection with a first antenna disposed in the vehicle cabin to detect one of (i) a state where the occupant is present in either a first region or a second region in the first detection zone to detect a presence of the occupant in the first detection zone, and (ii) a state where the occupant is not present in the first region and the second region in the first detection zone to detect an absence of the occupant in the first detection zone;
        perform a second detection with a second antenna disposed in the vehicle cabin to detect one of (i) a state where the occupant is present in either the second region or a third region in the second detection zone to detect the presence of the occupant in the second detection zone, and (ii) a state where the occupant is not present in the second region and the third region in the second detection zone to detect the absence of the occupant in the second detection zone; and
        determine whether the occupant is present in the first region, the second region, or the third region, based on a first detection result and a second detection result, wherein
    the second region is included in both the first detection zone and the second detection zone,
    in response to the first detection result determining the presence of the occupant in the first detection zone and the second detection result determining the absence of the occupant in the second detection zone, the processor is further configured to determine the occupant is present in the first region,
    in response to the first detection result determining the presence of the occupant in the first detection zone and the second detection result determining the presence of the occupant in the second detection zone, the processor is further configured to determine the occupant is present in the second region, and
    in response to the first detection result determining the absence of the occupant in the first detection zone and the second detection result determining the presence of the occupant in the second detection zone, the processor is further configured to determine the occupant is present in the third region;
    wherein an air-conditioner of the vehicle is controlled to provide air-conditioning to the first region in response to determining that the occupant is present in the first region, to provide air-conditioning to the second region in response to determining that the occupant is present in the second region, and to provide air-conditioning to the third region in response to determining that the occupant is present in the third region.

2. The occupant detection apparatus according to claim 1, wherein
    the processor is further configured to obtain a terminal ID from a wireless terminal carried by the occupant and to determine the presence of the occupant in the first region, the second region, or the third region based on the terminal ID.

3. The occupant detection apparatus according to claim 1, further comprising:
    a first antenna configured to detect the occupant in the first region or the second region in the first detection zone and to output a first detection signal;
    a first input terminal to the processor configured to receive the first detection signal from the first antenna and to input the first detection signal to the processor;
    a second antenna configured to detect the occupant in the second region or the region in the second detection zone and to output a second detection signal; and a second input terminal to the processor configured to receive the second detection signal from the second antenna and to input the second detection signal to the processor, wherein the processor is further configured to detect the presence of the occupant in the first region or the second region in the first detection zone based on the first detection signal from the first input terminal, and the processor is further configured to detect the presence of the occupant in the second region or the third region in the second detection zone based on the second detection signal from the second input terminal.

4. The occupant detection apparatus according to claim 1, wherein the plurality of detection zones further includes a third detection zone, the processor is further configured to perform a third detection to detect one of (i) a state where the occupant is present in either the third region or a fourth region in the third detection zone to detect the presence of the occupant in the third detection zone, and (ii) a state where the occupant is not present in the third region and the fourth region to detect the absence of the occupant in the third detection zone, and determine whether the occupant is present in the first region, the second region, the third region, or the fourth region based on the first detection, the second detection result, and a third detection result.

5. The occupant detection apparatus according to claim 4, wherein the processor is further configured to detect the presence of the occupant in one of the second region, the third region, or a fifth region in the second detection zone while performing the second detection, and determine the presence of the occupant in one of the first region, the second region, the third region, the fourth region, or the fifth region based on the first detection result, the second detection result, and the third detection result.

6. The occupant detection apparatus according to claim 5, further comprising:

a first antenna configured to detect the occupant in the first region or the second region in the first detection zone and to output a first detection signal;

a first input terminal to the processor configured to receive the first detection signal from the first antenna and to input the first detection signal to the processor;

a second antenna configured to detect the occupant in the second region, the third region, or the fifth region in the second detection zone and to output a second detection signal to the processor;

a second input terminal to the processor configured to receive the second detection signal from the second antenna and to input the second detection signal to the processor;

a third antenna configured to detect the occupant in the third region or the fourth region in the third detection zone and to output a third detection signal to the processor; and a third input terminal to the processor configured to receive the third detection signal from the third antenna and to input the third detection signal to the processor, wherein the processor is further configured to detect the presence of the occupant in the first region or the second region of the first detection zone based on the first detection signal;

the processor is further configured to detect the presence of the occupant in the second region, the third region, or the fifth region of the second detection zone based on the second detection signal; and the processor is further configured to detect the presence of the occupant in the third region or fourth region of the third detection zone based on the third detection signal.

7. The occupant detection apparatus according to claim 4, wherein the vehicle cabin has a plurality of seats including a driver's seat, a front passenger's seat, a first rear seat behind the driver's seat, and a second rear seat behind the front passenger's seat, the processor is further configured to detect the presence of the occupant in the driver's seat or the first rear seat in the first detection zone, detect the presence of the occupant in the first rear seat or the second rear seat in the second detection zone, and detect the presence of the occupant in the front passenger's seat or the second rear seat in the third detection zone.

8. The occupant detection apparatus according to claim 1, wherein the vehicle cabin has a plurality of seats, and each of the first region, the second region the third region, the fourth region, and the fifth region includes at least one of the plurality of seats.

9. An occupant detection system configured to detect a region where an occupant is present from among a plurality of detection zones in a vehicle cabin, the plurality of detection zones including a first detection zone and a second detection zone, the occupant detection system comprising:

a first antenna disposed in the vehicle cabin and configured to detect one of (i) a state where the occupant is present in either a first region or a second region in the first detection zone, and (ii) a state where the occupant is not present in the first region and the second region in the first detection zone, and to output a first detection signal in response to detecting a presence of the occupant in either the first region or the second region or an absence of the occupant in the first region and the second region;

a second antenna disposed in the vehicle cabin and configured to detect one of (i) a state where the occupant is present in either the second region or a third region in the second detection zone, and (ii) a state where the occupant is not present in the second region and the third region, and to output a second detection signal in response to detecting the presence of the occupant in either the second region or the third region or the absence of the occupant in the second region and the third region; and a processor configured to determine whether the occupant is present in the first region, the second region, or the third region, based on the first detection signal from the first antenna and the second detection signal from the second antenna;

wherein:

the second region is included in both the first detection zone and the second detection zone;

in response to the first antenna detecting the presence of the occupant in the first detection zone and the second antenna detecting the absence of the occupant in the second detection zone, the processor is further configured to determine the occupant is present in the first region;

in response to the first antenna detecting the presence of the occupant in the first detection zone and the second antenna detecting the presence of the occupant in the second detection zone, the processor is further configured to determine the occupant is present in the second region; and in response to the first antenna detecting the absence of the occupant in the first detection zone and the second antenna detecting the presence of the occupant in the second detection zone, the processor is further configured to determine the occupant is present in the third region;

wherein an air-conditioner of the vehicle is controlled to provide air-conditioning to the first region in response to determining that the occupant is present in the first region, to provide air-conditioning to the second region in response to determining that the occupant is present in the second region, and to provide air-conditioning to the third region in response to determining that the occupant is present in the third region.

10. An occupant detection method for detecting a region where an occupant is present from among a plurality of detection zones in a vehicle cabin, the plurality of detection zones including a first detection zone and a second detection zone, the occupant detection method comprising:

performing a first determination with a first antenna disposed in the vehicle cabin whether the first region and the second region are in one of (i) a state where the occupant is present in either a first region or a second region in the first detection zone to detect a presence of the occupant in the first detection zone, and (ii) a state where the occupant is not present in the first region and the second region in the first detection zone to detect an absence of the occupant in the first detection zone;

performing a second determination with a second antenna disposed in the vehicle cabin whether the second region and the third region are in one of (i) a state where the occupant is present in either the second region or a third region in the second detection zone to detect the presence of the occupant in the second detection zone, and (ii) a state where the occupant is not present in the second region and the third region in the second detection zone to detect the absence of the occupant in the second detection zone, the second region being included in both the first detection zone and the second detection zone; and determining whether the occupant is present in the first region, the second region, or the third region, based on a result of the first determination and a result of the second determination;

determining, in response to the result of the first determination indicating the presence of the occupant in the first detection zone and the result of the second determination indicating the absence of the occupant in the second detection zone, that the occupant is present in the first region;

determining, in response to the result of the first determination indicating the presence of the occupant in the first detection zone and the result of the second determination indicating the presence of the occupant in the second detection zone, that the occupant is present in the second region; and determining, in response to the result of the first determination indicating the absence of the occupant in the first detection zone and the result of the second determination indicating the presence of the occupant in the second detection zone, that the occupant is present in the third region;

wherein an air-conditioner of the vehicle is controlled to provide air-conditioning to the first region in response to determining that the occupant is present in the first region, to provide air-conditioning to the second region in response to determining that the occupant is present in the second region, and to provide air-conditioning to the third region in response to determining that the occupant is present in the third region.

\* \* \* \* \*